Nov. 7, 1967

R. A. BUSHCOTT ET AL 3,351,689

METHOD FOR MAKING LAMP SHADES

Filed Sept. 6, 1963

INVENTORS.
Rudolph A. Bushcott,
Elmer E. Waldmann,
By Brown, Jackson, Boettcher & Dienner
Attys.

Nov. 7, 1967  R. A. BUSHCOTT ET AL  3,351,689
METHOD FOR MAKING LAMP SHADES
Filed Sept. 6, 1963  3 Sheets-Sheet 2
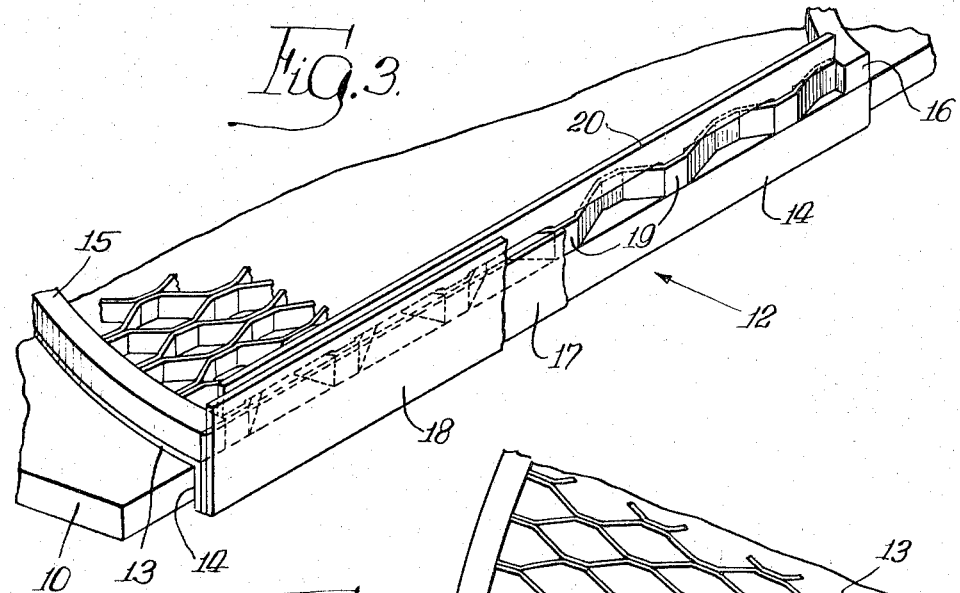
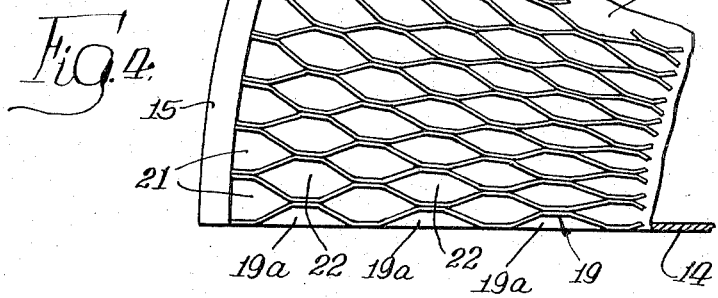
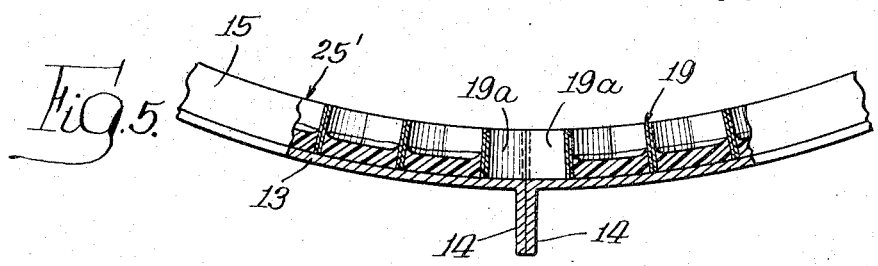
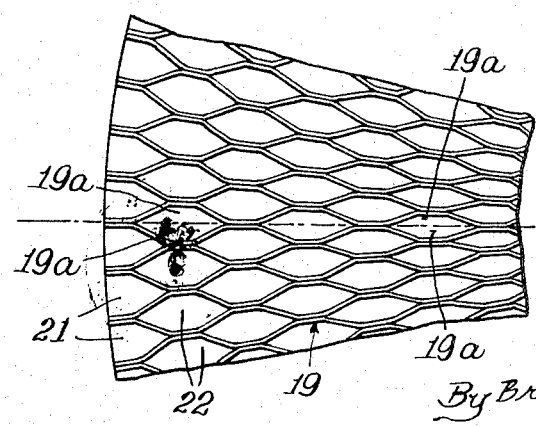
INVENTORS.
Rudolph A. Bushcott,
Elmer E. Waldmann,
By Brown, Jackson, Boettcher & Dienner
Attys.

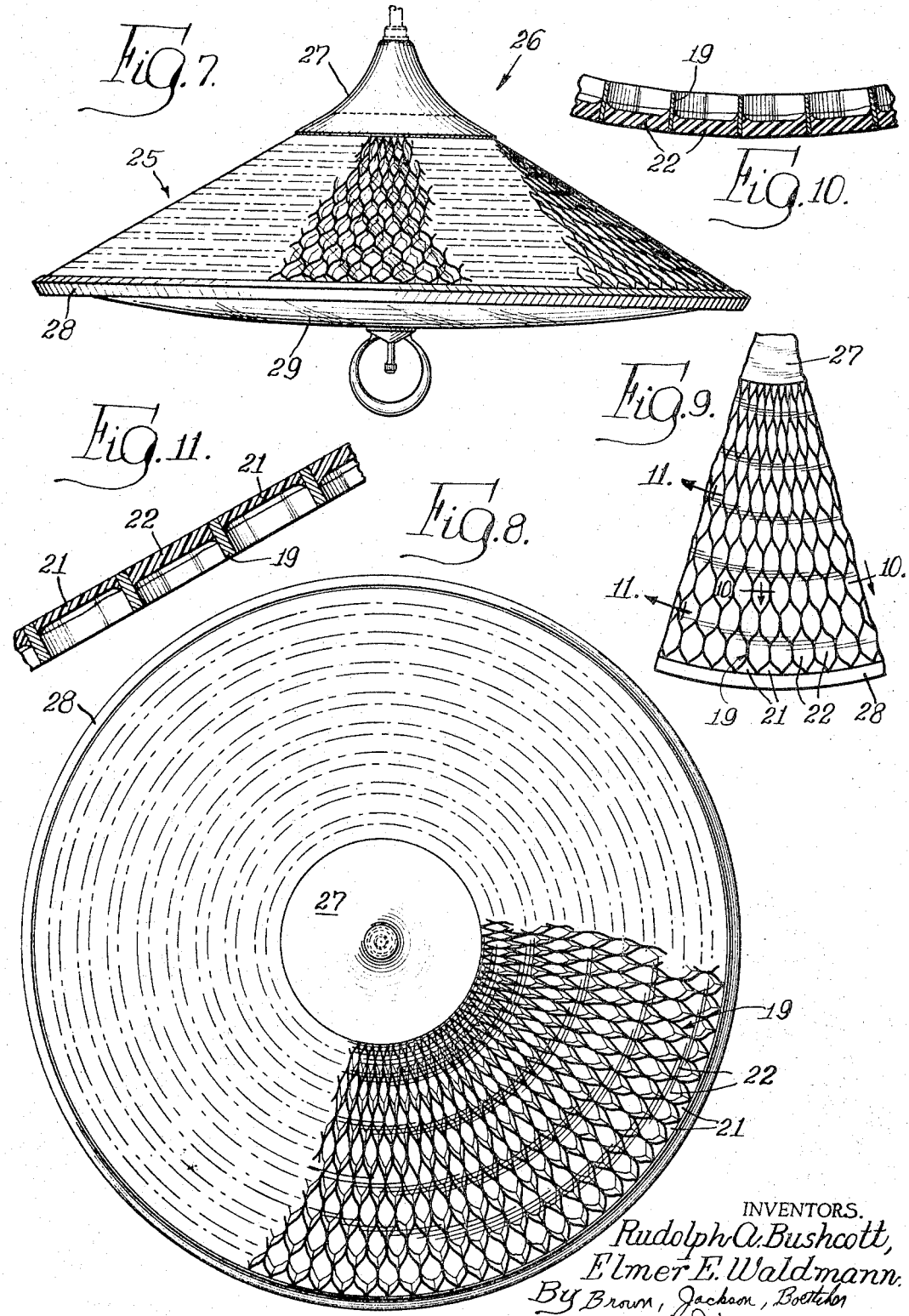

United States Patent Office 3,351,689
Patented Nov. 7, 1967

3,351,689
METHOD FOR MAKING LAMP SHADES
Rudolph A. Bushcott, Fort Atkinson, and Elmer E. Waldmann, Jefferson, Wis., assignors to Thomas Industries Inc., Louisville, Ky., a corporation of Delaware
Filed Sept. 6, 1963, Ser. No. 307,246
6 Claims. (Cl. 264—69)

Our present invention relates generally to a method for making lamp shades adapted to be mounted about a light source for diffusing light emitted by the latter, and more particularly to a method for making lamp shades of the type described and claimed in the copending application of Rudolph A. Bushcott, Ser. No. 307,045, filed Sept. 6, 1963, now abandoned.

It is a primary object of our present invention to provide a new and novel method for making a lamp shade comprised of a cellular or honeycomb member and translucent material within the cells of the member.

It is another object of our present invention to provide a method, as described, wherein the honeycomb member is formed into a non-planar shape and the translucent material in each cell of the honeycomb member is arranged to present an exterior surface substantially in the plane of the exterior edges of the adjacent cell walls.

It is a further object of our invention to provide a method, as described, wherein the translucent material is cured while in the cells of the honeycomb member to thereby form a rigid lamp shade.

In accomplishing the foregoing objects, we provide a method wherein translucent material, such as resin, is poured into a flexible mold, and a sheet of cellular or honeycomb material is spread out into the shape of the mold and into the resin. After allowing the resin to gel, the mold is bent into a predetermined non-planar shape and then removed from the cellular material and resin. Finally, the resin is cured to rigidify the cellular material in the predetermined shape.

In one specific application of the method of our invention, we employ a generally circular mold comprised of a thin flexible metal sheet formed with an open sector and having a flexible upstanding wall about the outer periphery thereof. This mold is positioned on a horizontal supporting surface while receiving the resin and honeycomb material. Thereafter, it is bent into a truncated cone at which time the seam along the abutting radial edges of the honeycomb material is filled with resin that is allowed to gel to complete a shade form. In this case, the final rigidified shade form has the shape of a truncated cone, and the translucent resin within each cell presents a separate facet substantially in the plane of the exterior edges of the adjacent cell walls. The resultant shade produces unique illumination and visual effects.

Now in order to acquaint those skilled in the art with the manner of utilizing methods in accordance with the principles of our present invention, we shall describe in connection with the accompanying drawings, a preferred embodiment of our invention.

In the drawings:

FIGURE 3 is a fragmentary perspective view of the portion of the mold shown in FIGURE 2;

FIGURE 4 is a fragmentary plan view of a portion of the honeycomb and translucent material along one radial edge thereof at an intermediate stage of the method of our present invention;

FIGURE 5 is a partial end elevational view of the mold, together with the honeycomb and translucent material therein, after it has been bent into a conical shape;

FIGURE 6 is a fragmentary plan view of the abutting radial edges of the honeycomb material of FIGURE 5;

FIGURE 7 is a side elevational view of a lamp shade which has been made in accordance with the method of our present invention and which is shown in association with a light fixture;

FIGURE 8 is a plan view of the light fixture and lamp shade of FIGURE 7;

FIGURE 9 is a perpendicular view of a sector of the lamp shade of FIGURE 7;

FIGURE 10 is a fragmentary sectional view, taken substantially along the line 10—10 in FIGURE 9, looking in the direction indicated by the arrows; and FIGURE 11 is a fragmentary sectional view, taken substantially along the line 11—11 in FIGURE 9, looking in the direction indicated by the arrows.

Figure 1:
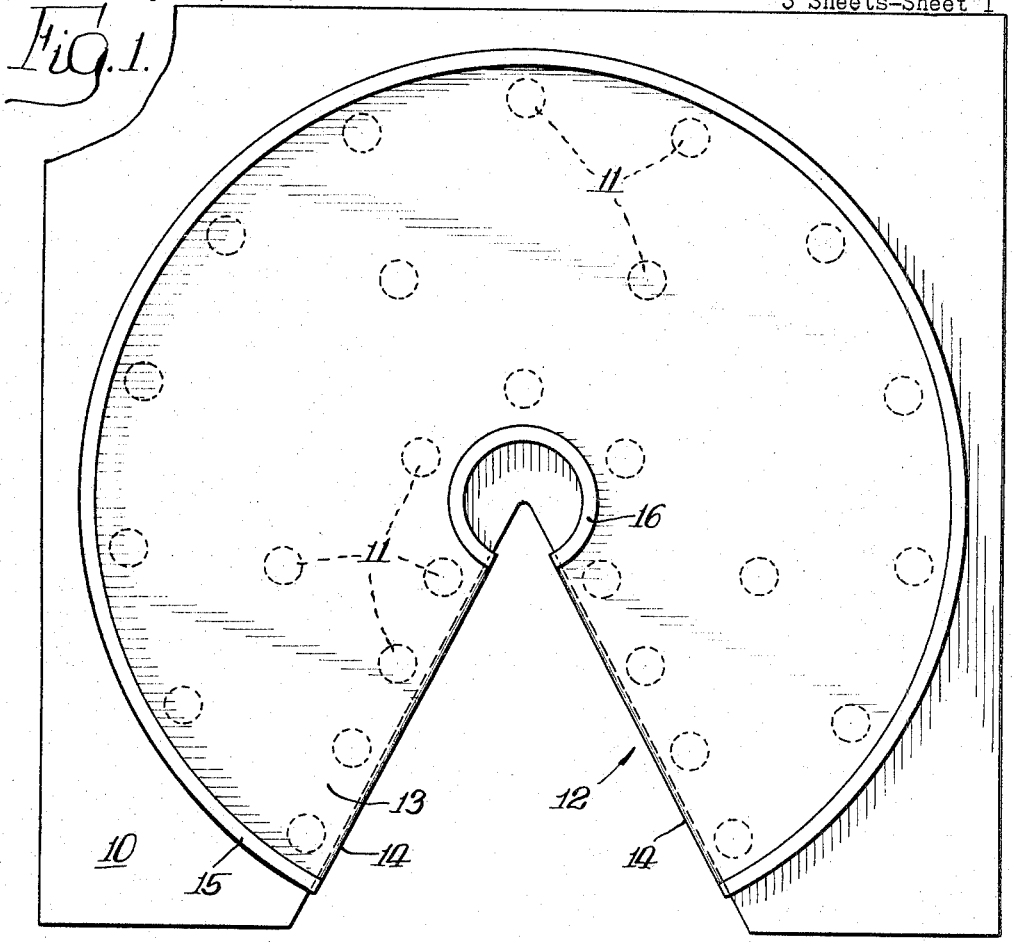
FIGURE 1 is a plan view of one form of mold used in connection with the method of our present invention.

Referring now to FIGURE 1, there is shown the top 10 of a work table or the like, which is provided with a series of recessed magnets 11, and from which a triangular sector has been removed at one side thereof. The work top 10 serves to support a mold 12 which preferably comprises a thin, flexible metal sheet 13 having a highly polished surface. In the manufacture of a truncated conical lamp shade, the sheet 12 is generally circular and is formed with a central circular opening and with a communicating open sector. The radial edges of the sheet 13 along the sides of the open sector are turned downwardly to define depending flanges 14. The flanges 14 are received in the opening of the work top 10 defined by the removed sector, while the remainder of the sheet 13 rests flat against the surface of the work top 10. The sheet 13 is retained tightly against the surface of the work top 10 by the attractive force of the magnets 11. The mold 12 further comprises a flexible outer upstanding wall or dam 15 formed of a substantially annular strip of resilient material, such as rubber, which is suitably secured to the upper surface of the sheet 13 adjacent the outer periphery thereof. A flexible inner upstanding wall or dam 16 formed of a substantially annular strip of resilient material, such as rubber, is similarly secured to the upper surface of the sheet 13 adjacent the periphery of the central opening therein.

Figure 2:
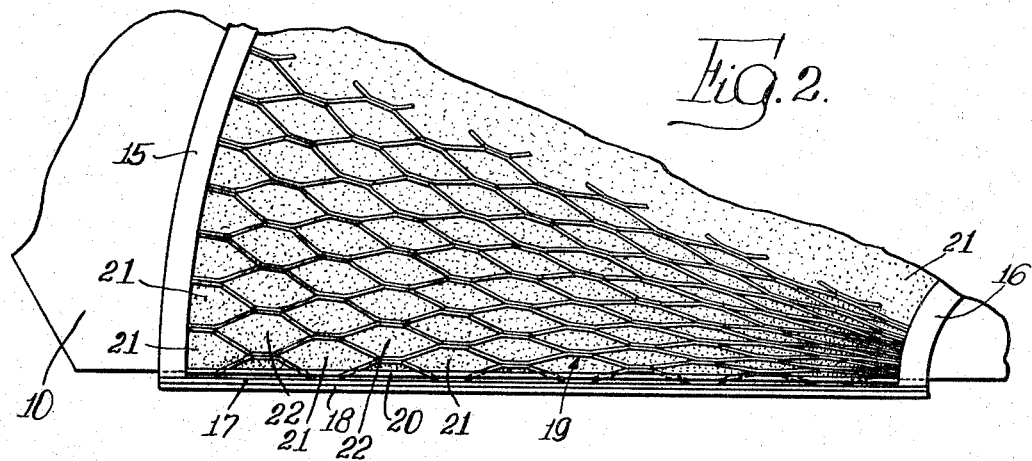
FIGURE 2 is a fragmentary plan view of a portion of the mold of FIGURE 1 along one radial edge thereof, and shows honeycomb translucent material lying within the mold.

After the mold 12 has been suitably located on the work top 10, a strip of pressure sensitive tape 17 (FIGURES 2 and 3) is secured to each of the mold flanges 14 with the upper edge portions of the tape strips projecting upwardly to about the plane of the tops of the upstanding walls 15 and 16. Then a strip of metal 18 is placed against the back side of each strip of tape 17 and the metal strips are suitably secured to the adjacent mold flanges 14 by conventional clamping means (not shown). The upper longitudinal portions of the metal strips 18 extend upwardly beyond the plane of the tops of the upstanding walls 15 and 16, and the metal strips 18 serve as dams along the radial edges of the mold 12.

Next, a sheet of cellular material 19 is spread or fanned out into the shape of the mold 12, and the free edges of the cellular material 19 are brought into engagement at spaced points with the upper portions of the front sides of the strips of pressure sensitive tape 17 to temporarily maintain the cellular material spread out. The cellular material 19 is preferably comprised of a sheet of commercial preformed kraft fiber cellular honeycomb material. Then the downwardly extending fingers of a metal comb or gauge 20 are disposed within the cells of the honeycomb material 19 along each of the radial free edges thereof, and the gauges 20 are suitably secured to the metal strips 18 by conventional clamping means (not shown).

At this stage of our method, the honeycomb material 19, while remaining clamped along its radial edges, is lifted or folded away from or out of the mold 12. While the honeycomb material 19 is maintained out of the mold 12, a fluid resin mixture 21 of a preselected color is poured into the mold 12 to a level lower than the plane of the tops of the rubber dams 15 and 16. By way of illustration, the resin mixture 21 may comprise a thermosetting styrene modified polyester resin, of the type sold by the American Cyanamid Company and identified as Resin No. 4110–4–6, combined with 3 percent methyl ethyl ketone peroxide, a catalyst, and .05 percent cobalt naphthanate, an accelerator. The resin 21 is allowed to set for two or three minutes and then the honeycomb material 19 is replaced inside the mold 12 and into the resin 21 and fanned out in a uniform shape. The lower edges of the honeycomb material 19 are urged into contact with the sheet metal surface 13 whereby the resin 21 is introduced into the cells and fills them part way up through the honeycomb. Weights, which may be in the form of rectangular thin plates, are placed on top of the honeycomb material 19 to retain it in the designated position for about 15 to 20 minutes while the resin 21 is jelling.

When the resin 21 has jelled, and if a shade of two colors is desired, a second fluid resin mixture 22, which differs from the resin mixture 21 only in color, is poured into alternate annular rows of the cells of the honeycomb material 19. The color of the second mixture of resin 22 is so selected that it will, in combination with the original resin mixture 21, produce the desired second color. The second mixture of resin 22 is allowed to set for about five to ten minutes until it has jelled.

With the resins 21 and 22 thus jelled, but not yet hard, the clamp means between the mold flanges 14 and the metal strips 18, and between the metal strips 18 and the gauges 20, are removed, and the tapes 17, metal strips 18 and gauges 20 are withdrawn from the mold 12. Then the resins 21 and 22 within the half cells 19a along the radial edges of the honeycomb material 19 (FIGURE 4) are cut out or trimmed away by means of a knife or other sharp instrument. At this point, the mold 12 is formed or bent into a truncated cone with the sheet metal 13 on the exterior thereof, the mold flanges 14 are clamped together, and the mold 12 is supported in a jig (not shown) with the radial edges of the honeycomb material 19 in abutment and horizontal (FIGURE 5). In this position, the corresponding half cells 19a along each radial edge of the honeycomb material 19 are aligned to form complete cells (FIGURE 6), so that there is no interrupted appearance in the surface of the honeycomb material 19. The seam between the radial edges of the honeycomb material 19, and the open cells along the seam, are then filled with the resin mixture 21. To assure a satisfactory seam, a vibrating needle is moved back and forth through the resin 21 along the seam between the half cells to agitate the resin and drive out any entrapped air. Further resin 21 may be added to the cells along the seam as required. The foregoing steps serve to produce a shade form 25'.

When the resin along the seam has jelled, and while exothermnig begins, the mold is removed from the jig and placed over a conical support (not shown). Following exotherming, which takes place at a tempertaure ranging up to 300° F. to 400° F., is completed in about 15 to 30 minutes, and after the shade form 25' has cooled down, the mold 12 is stripped off of the latter. Then a metal cover of conical shape (not shown) is placed over and fastened down upon the shade form 25'.

In the next step of our method, the described assembly is heated at a tempertaure of about 250° F. for about 18 minutes to cure the resins 21 and 22 within the cells of the honeycomb material 19 so as to rigidify the latter. Thereafter, the assembly is allowed to cool and the conical metal cover is removed. Next, the seam of the shade form 25' is scraped, the shade form 25' is removed from the conical support, and the seam thereof is sanded and buffed to provide a final truncated conical shade 25.

From the foregoing description, it will be appreciated that the honeycomb member 19 is embedded in the translucent resins 21 and 22. In the formation of the conical shade 25, a very small meniscus edge is formed along the edges of the honeycomb material 19, and the exterior surface of the translucent material 21 and 22 within each cell tends to be slightly concave. Nevertheless, the translucent material 21 and 22 presents exterior surfaces substantially in the plane of the exterior edges of the adjacent cell walls of the honeycomb member 19. Thus, the wall of the shade 25 is divided generally into a honeycomb pattern and more particularly into a plurality of irregular hexagonal shaped light transmitting sections of translucent material 21 and 22 whereby a multiplicity of facets are presented on the outer surface of the shade. In addition, instead of producing a multi-colored shade 25 as described, the shade may be formed exclusively with translucent material 21 of a uniform color, and the back side of alternate rows of cells then sprayed with a lacquer or resin of a color different than that of the translucent material 21.

Referring now to FIGURES 7 and 8, the lamp shade 25 made according to the steps outlined above is shown in conjunction with one form of illustrative light fixture 26. In brief, the upper outer peripheral margin of the shade 25 underlies the outwardly flared lower peripheral margin of a bell-shaped cover member 27, and the lower peripheral margin of the shade 25 is enclosed by an annular trim ring 28. The fixture 26 further includes a lower dished glass shade 29 and a source of light such as an incandescent lamp or the like (not shown). For further details concerning the construction of the light fixture 26 and the mounting of the shade 25 therein, reference may be had to the copending application of Rudolph A. Bushcott, Ser. No. 307,045 filed Sept. 6, 1963, now abandoned.

When the shade 25, as shown in FIGURES 7 through 11, is illuminated exteriorly and viewed by light reflected from the surface of the shade, the facets appear glossy, shiny or lustrous and glisten or sparkle as the facets of a gem. Contrastingly, when the shade is illuminated interorly, light passing through the facets thereof appears diffused. Also, irrespective of the manner in which the shade is illuminated, the cell walls of the honeycomb material 19 provide the shade wall with an unusual pattern effect, and the sides of the cell walls provide an appearance of narrow shadow bands along the boundary of each facet. Thus, a shade produced by our method has unusual illumination characteristics. While our invention has been particularly described in terms of preferred steps and materials, it is not intended that the invention be limited to these or any other specific steps or materials, since variations within the scope of the invention will readily suggest themselves to those skilled in the art. Moreover, it will be readily appreciated that the steps of our present invention may be used in making a shade in a shape other than that of a truncated cone.

We claim:

1. A method of making a lamp shade comprising the steps of: placing on a horizontal supporting surface a generally circular mold comprised of a thin flexible metal sheet formed with an open sector and having an upstanding wall about the outer periphery thereof, pouring a thermosetting resin into said mold, spreading out a sheet of honeycomb material into the shape of said mold and into said resin with the lower edges thereof in contact with the surface of said metal sheet, allowing said resin to jell, removing the portion of the upstanding wall along the radial edges of said mold, bending said mold into a truncated cone and bringing the radial edges of said honeycomb material into abutting relation whereby a seam is defined, pouring thermosetting resin into said seam along the abutting radial edges of said honeycomb material, allowing said resin along said seam to jell to complete a shade form, and curing said resin to thereby rigidify said shade form into a shade.

2. A method of making a lamp shade comprising the steps of: placing on a supporting surface a generally circular mold comprised of a thin flexible metal sheet formed with an open sector and having an upstanding wall about the outer periphery thereof, pouring a thermosetting resin into said mold, spreading out a sheet of honeycomb material into the shape of said mold and into said resin with the lower edges thereof in contact with the surface of said metal sheet, allowing said resin to jell, removing the portion of the upstanding wall along the radial edges of said mold, trimming away said resin from within the half cells along the radial edges of said honeycomb material, bending said mold into a truncated cone with said metal sheet on the outside thereof, clamping the radial edges of said mold together whereby a seam is defined along the abutting radial edges of said honeycomb material, pouring thermosetting resin into said seam along the abutting radial edges of said honeycomb material, allowing said resin along said seam to jell to complete a shade form, removing said mold from said shade form, and heating said shade form to cure said resin and thereby rigidify said shade form into a shade.

3. A method of making a lamp shade comprising the steps of: placing on a supporting surface a generally circular mold comprised of a thin flexible metal sheet formed with an open sector and having depending flanges along the radial edges thereof projecting below the supporting surface and a flexible upstanding wall about the outer periphery thereof, clamping a metal strip to each of said mold flanges, spreading out a sheet of honeycomb material into the shape of said mold, clamping the cells of said honeycomb material adjacent each of the radial edges thereof to the adjacent metal strip, folding said honeycomb material out of said mold, pouring a thermosetting resin into said mold, replacing said honeycomb material inside said mold and into said resin with the lower edges thereof in contact with the surface of said metal sheet, allowing said resin to jell, removing said metal strips, trimming away said resin from within the half cells along the radial edges of said honeycomb material, bending said mold into a truncated cone with said metal sheet on the outside thereof, clamping said mold flanges together whereby a seam is defined along the abutting radial edges of said honeycomb material, pouring thermosetting resin into said seam along the abutting radial edges of said honeycomb material, allowing said resin along said seam to jell to complete a shade form, removing said mold from said shade form, and heating said shade form to cure said resin and thereby rigidify said shade form into a shade.

4. A method of making a lamp shade comprising the steps of: placing on a supporting surface a generally circular mold comprised of a thin flexible metal sheet formed with an open sector and having depending flanges along the radial edges thereof projecting below the supporting surface and a flexible upstanding wall about the outer periphery thereof, positioning a metal strip along each of said mold flanges with the upper longitudinal portions thereof projecting upwardly beyond the plane of the top of said upstanding mold wall, camping said metal strips to the adjacent mold flanges, spreading out a sheet of honeycomb material into the shape of said mold, disposing the fingers of a metal strip gauge into the cells of said honeycomb material adjacent each of the radial edges thereof, clamping each of said gauges to the adjacent metal strip, folding said honeycomb material out of said mold, pouring a thermosetting resin of one color into said mold, replacing said honeycomb material inside said mold and into said resin with the lower edges thereof in contact with the surface of said metal sheet, allowing said resin to jell, pouring a thermosetting resin of a second color into alternate annular rows of the cells of said honeycomb material, allowing said second resin to jell, removing said gauges and metal strips, trimming away said resin from within the half cells along the radial edges of said honeycomb material, bending said mold into a truncated cone with said metal sheet on the outside thereof, clamping said mold flanges together whereby a seam is defined along the abutting radial edges of said honeycomb material, pouring thermosetting resin into said seam along the abutting radial edges of said honeycomb material to complete a shade form, allowing said resin along said seam to jell, removing said mold from said shade form, and heating said shade form to cure said resins and thereby rigidify said shade form into a shade.

5. A method of making a lamp shade comprising the steps of: placing on a supporting surface a generally circular mold comprised of a thin flexible metal sheet formed with an open sector and having depending flanges along the radial edges thereof projecting below the supporting surface and a flexible upstanding wall about the outer periphery thereof, placing a strip of pressure sensitive tape against each of said mold flanges with the upper longitudinal edges thereof projecting upwardly to about the plane of the top of said upstanding mold wall, positioning a metal strip against the back face of each of said strips of tape and clamping the same to the adjacent mold flange, spreading out a sheet of honeycomb material into the shape of said mold with the free edges thereof being brought into engagement with the upper longitudinal portions of said tape, disposing the fingers of a metal strip gauge into the cells of said honeycomb material adjacent each of the radial edges thereof, clamping each of said gauges to the adjacent metal strip, folding said honeycomb material out of said mold, pouring a polyester thermosetting resin of one color into said mold to a level lower than the top of said upstanding mold wall, replacing said honeycomb material inside said mold and into said resin with the lower edges thereof in contact with the surface of said metal sheet, allowing said resin to jell, pouring a polyester thermosetting resin of a second color into alternate annular rows of the cells of said honeycomb material, allowing said second resin to jell, removing said gauges and metal strips and tape, trimming away said resin from within the half cells along the radial edges of said honeycomb material, bending said mold into a truncated cone with said metal sheet on the outside thereof, clamping said mold flanges together whereby a seam is defined along the abutting radial edges of said honeycomb material, supporting said mold with the abutting radial edges of said honeycomb material in a hroizontal position, pouring polyester thermosetting resin into said seam along the abutting radial edges of said honeycomb material to complete a shade form, agitating said resin along said seam, allowing said resins along said seam to jell, placing said mold and shade form on a support, removing said mold from said shade form, fastening a metal cover over said shade form, heating said shade form to cure said resins and thereby rigidify said shade form into a shade, and removing the shade from said cover and support.

6. A method of making a lamp shade comprising the steps of: placing on a supporting surface a generally circular mold comprised of a thin flexible metal sheet formed with an open sector and having depending flanges along the radial edges thereof projecting below the supporting surface and a flexible upstanding wall about the outer periphery thereof, placing a strip of pressure sensitive tape against each of said mold flanges with the upper longitudinal edges thereof projecting upwardly to about the plane of the top of said upstanding mold wall, positioning a metal strip against the back face of each of said strips of tape and clamping the same to the adjacent mold flange, spreading out a sheet of honeycomb material into the shape of said mold with the free edges thereof being brought into engagement with the upper longitudinal portions of said tape, disposing the fingers of a metal strip gauge into the cells of said honeycomb material adjacent each of the radial edges thereof, clamping each of said gauges to the adjacent metal strip, folding said honeycomb material out of said mold, pouring a polyester thermosetting resin of one color into said mold to a level lower than the top of said upstanding mold wall, allowing said resin to set for two or three minutes, replacing said honeycomb material inside said mold and into said resin with the lower edges thereof in contact with the surface of said metal sheet, placing weight on top of said honeycomb material to retain it in the desired position, allowing said resin to set for 15 to 20 minutes to jell, pouring polyester thermosetting resin of a second color into alternate annular rows of the cells of said honeycomb material, allowing said second resin to set for 5 to 10 minutes to jell, removing said gauges and metal strips and tape, trimming away said resin from within the half cells along the radial edges of said honeycomb material, bending said mold into a truncated cone with said metal sheet on the outside thereof, clamping said mold flanges together whereby a seam is defined along the abutting radial edges of said honeycomb material, supporting said mold with the abutting radial edges of said honeycomb material in a horizontal position, pouring polyester thermosetting resin of said one color into the seam along the abutting radial edges of said honeycomb material to complete a shade form, moving a vibrating needle back and forth through said resin along said seam, allowing said resins along said seam to jell, placing said mold and shade form on a conical support, removing said mold from said shade form, fastening a conical metal cover over said shade form, heating said shade form at about 250° F. for about 18 minutes to cure said resins and thereby rigidify said shade form into a shade, and removing said cover and shade from said conical support.

References Cited
UNITED STATES PATENTS

| | | | |
|---|---|---|---|
| 1,344,087 | 6/1920 | Kline | 264—316 |
| 2,379,248 | 6/1945 | Muskat. | |
| 2,797,439 | 7/1957 | Borkland | 264—320 X |
| 2,813,053 | 11/1957 | Tuomala. | |
| 2,976,093 | 3/1961 | Reiling | 264—273 X |
| 2,985,968 | 5/1961 | Koch. | |
| 3,066,376 | 12/1962 | Pennell | 264—316 |
| 3,103,460 | 9/1963 | Picket. | |
| 3,135,449 | 6/1964 | Kasper. | |

OTHER REFERENCES

May, George: Plastics (London), "Thermoplastic Honeycombs," vol. 16, November 1951, pp. 305–307.

ROBERT F. WHITE, *Primary Examiner.*

L. S. SQUIRES, T. J. CARVIS, *Assistant Examiners.*